United States Patent
Nagarale et al.

(10) Patent No.: US 12,126,293 B2
(45) Date of Patent: Oct. 22, 2024

(54) METHOD AND SYSTEM FOR CONTROLLING AN ELECTRIC MACHINE

(71) Applicant: GM GLOBAL TECHNOLOGY OPERATIONS LLC, Detroit, MI (US)

(72) Inventors: Tanvi Nagarale, Auburn Hills, MI (US); Brent S. Gagas, Pleasant Ridge, MI (US); Brian A. Welchko, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 206 days.

(21) Appl. No.: 17/971,851

(22) Filed: Oct. 24, 2022

(65) Prior Publication Data

US 2024/0072717 A1    Feb. 29, 2024

Related U.S. Application Data

(60) Provisional application No. 63/400,813, filed on Aug. 25, 2022.

(51) Int. Cl.
*H02P 29/68* (2016.01)
*H02P 27/08* (2006.01)

(52) U.S. Cl.
CPC .............. *H02P 29/68* (2016.02); *H02P 27/08* (2013.01)

(58) Field of Classification Search
CPC .......... H02P 29/68; H02P 27/08; H02P 7/288; G01K 7/18

USPC ........................................................ 318/472
See application file for complete search history.

(56) References Cited

U.S. PATENT DOCUMENTS

| | | | |
|---|---|---|---|
| 9,203,340 B2 * | 12/2015 | Yamaguchi | H02P 29/68 |
| 10,819,218 B2 * | 10/2020 | Maeda | H02M 7/003 |

OTHER PUBLICATIONS

Liu et al. (CN 109600021 A) Radiator Clogging Degree Determining Method and Device of Variable Flow Device Date Published Apr. 9, 2019 (Year: 2019).*
Taguchi et al. (JP 2016006824 A) Cooler Date Published Jan. 14, 2016 (Year: 2016).*
Tomoshi (JP 2020089056 A)Converter Date Published Jun. 4, 2020 (Year: 2020).*

* cited by examiner

*Primary Examiner* — Jorge L Carrasquillo
(74) *Attorney, Agent, or Firm* — Quinn IP Law

(57) ABSTRACT

A control system for a rotary electric machine includes an inverter including a plurality of power switches, a heat exchanger, first temperature sensors arranged to monitor the power switches, a second temperature sensor arranged to monitor the heat exchanger, and a controller. An expected power loss is determined based upon electric current, switching functions, and electrical characteristics of the power switches. A plurality of power capacity terms are determined based upon the expected power loss in the inverter, the temperatures of the power switches, and the temperature of the heat exchanger. The inverter is controlled based upon the aforementioned power capacities.

6 Claims, 4 Drawing Sheets

METHOD AND SYSTEM FOR CONTROLLING AN ELECTRIC MACHINE

CROSS-REFERENCE TO RELATED APPLICATIONS

This application claims the benefit of U.S. Provisional Patent Application No. 63/400,813 filed on Aug. 25, 2022, the disclosure of which is hereby incorporated by reference.

INTRODUCTION

In a multi-phase rotary electric machine, traction torque or reactive torque may be generated by multiple alternating current (AC) waveforms that pass through three or more phase leads. The multiple AC waveforms operate at the same frequency and amplitude, but with a time offset or phase shift between the different phases. In a vehicle or other system using an electric machine, a power inverter generates phased AC waveforms that are transferred to individual stator windings of the rotary electric machine to induce a changing magnetic field. This magnetic field causes the rotation of a rotor to occur, which in turn provides motor output torque or regenerative torque. The motor output torque may be harnessed and directed as needed to perform useful work, e.g., propelling the vehicle.

Heat is generated by operation of multi-phase rotary electric machines as a result of electric current passing through electrical conductors, semiconductors, and other components, which have electrical resistances. Some level of heat generation is acceptable. However, heat generation leading to excessive temperatures may lead to deterioration and degradation of materials of the electrical conductors, semiconductors, and other components, which may lead to a fault and/or reduction in service life thereof.

SUMMARY

There is a need for a rotary electric machine and an associated inverter and control system that are capable of monitoring or otherwise determining relevant temperatures to prevent occurrence of excessive temperatures in the electrical conductors, semiconductors, and other components of the power inverter and/or electric machine. This includes a need to derate a maximum power output from the electric machine in order to preclude occurrence of an excess temperature environment in the inverter, including avoiding a temperature environment proximal to semiconductor power switches that is greater than a manufacturer-rated junction temperature.

The concepts described herein provide a system and associated method for integrating a temperature sensor-measured semiconductor junction temperature in conjunction with model-based semiconductor junction temperature estimator, which allows robust device thermal protection, faster stall torque recovery and protection against invalid semiconductor junction temperature estimation from a thermal model.

An aspect of the disclosure includes a control system for a multi-phase electric machine that includes an inverter configured to transfer electric energy from a rechargeable energy storage device (RESS) to the multi-phase electric machine, wherein the inverter is composed of a plurality of power switches; a heat exchanger, the heat exchanger thermally coupled to the inverter; a plurality of first temperature sensors, wherein the plurality of first temperature sensors are arranged to monitor temperatures of the plurality of power switches; a second temperature sensor, wherein the second temperature sensor is arranged to monitor a parameter of the heat exchanger; and a controller that is operatively connected to the inverter and in communication with the plurality of first temperature sensors and the second temperature sensor. The controller includes an instruction set that is executable to determine an expected power loss in the inverter, wherein the magnitude of the power loss is determined based upon electric current, switching functions, and electrical characteristics of the plurality of power switches; determine a first temperature parameter based upon the expected power loss in the inverter and the parameter of the heat exchanger; determine a first power capacity based upon the expected power loss in the inverter and the first temperature parameter; determine a second temperature parameter based upon the temperatures of the plurality of power switches, and determine a second power capacity based upon the second temperature parameter; determine a third temperature parameter based upon the first temperature parameter and a difference between the temperatures of the plurality of power switches and the parameter of the heat exchanger, and determine a third power capacity based upon the third temperature parameter; determine a fourth temperature parameter based upon the second temperature parameter and the difference between the temperatures of the plurality of power switches and the parameter of the heat exchanger, and determine a fourth power capacity based upon the fourth temperature parameter; and control the inverter based upon the first power capacity, the second power capacity, the third power capacity, and the fourth power capacity.

Another aspect of the disclosure may include the plurality of first temperature sensors being one of a plurality of thermistors or a plurality of thermocouples.

Another aspect of the disclosure may include the heat exchanger being a fluidic heat exchanger thermally coupled to the plurality of power switches, and wherein the second temperature sensor is arranged to monitor temperature of a fluid that is circulated through the fluidic heat exchanger.

Another aspect of the disclosure may include the instruction set being executable to control the inverter based upon a minimum of the first power capacity, the second power capacity, the third power capacity, and the fourth power capacity.

Another aspect of the disclosure may include the instruction set being executable to derate a maximum power output of the inverter based upon the minimum of the first power capacity, the second power capacity, the third power capacity, and the fourth power capacity.

Another aspect of the disclosure may include the instruction set being executable to determine valid ones of the first temperature parameter, the second temperature parameter, the third temperature parameter, and the fourth temperature parameter; and to control the inverter based upon a minimum of the valid ones of the first power capacity, the second power capacity, the third power capacity, and the fourth power capacity.

Another aspect of the disclosure may include a derating method for an electric machine that includes determining a first derating of the electric machine based on a model-based semiconductor junction temperature estimation; determining a second derating of the electric machine based on a temperature sensor-based semiconductor junction temperature estimation; determining a third derating of the electric machine based on difference between the model-based semiconductor junction temperature estimation and a coolant temperature; determining a fourth derating of the electric machine based upon a difference between the temperature sensor-based semiconductor junction temperature estimation and the coolant temperature; and derating power output from the electric machine based upon a minimum of the first derating, the second derating, the third derating, and the fourth derating.

Another aspect of the disclosure may include extending a stall-worry zone timer when the model-based semiconductor junction temperature estimator is valid and the semiconductor junction temperature-based derating is enabled.

Another aspect of the disclosure may include utilizing a restricted stall-worry zone timer when the model-based semiconductor junction temperature estimator is invalid or when the semiconductor junction temperature-based derating is disabled.

Another aspect of the disclosure may include determining the first derating of the electric machine based on model-based semiconductor junction temperature estimation by estimating semiconductor junction temperature from estimation of power loss across power semiconductor devices, thermal impedances and coolant temperature; and calculating the first derating from the estimated semiconductor junction temperature and pre-determined threshold using linear interpolation.

Another aspect of the disclosure may include determining the derating based on temperature sensor-based semiconductor junction temperature estimation by estimating the semiconductor junction temperature directly from a temperature sensor measurement; estimating the semiconductor junction temperature from the temperature sensor measurement and coolant temperature; calculating the second derating based upon one of an average or maximum of the two temperature sensor mapped semiconductor junction temperatures and pre-determined thresholds using linear interpolation. This includes estimating semiconductor junction temperature from directly mapping temperature sensors, and using temperature sensor measurements and the coolant temperature. The final temperature is either an average or a maximum of two temperatures and the second derating capacity is based upon the final temperature sensor-based semiconductor junction temperature.

Another aspect of the disclosure may include the second derating being determined based on temperature sensor-based semiconductor junction temperature estimation by offsetting temperature sensor mapped semiconductor junction temperature measurements to consider coolant temperature variations and physical locations of the temperature sensors.

Another aspect of the disclosure may include the derating being based upon a difference between the temperature sensor-based semiconductor junction temperature estimation and the coolant temperature, including determining a temperature differential from model-based semiconductor junction temperature estimation and coolant temperature measurement; and determining the third and fourth deratings based upon the temperature differential and pre-determined thresholds using linear interpolation. The third derating is based upon the temperature sensor-based semiconductor junction temperature estimation and the coolant temperature, and the fourth derating is based upon the model-based semiconductor junction temperature estimation and coolant temperature measurement.

Another aspect of the disclosure may include implementing a calibratable time delay before extending stall-worry zone timers when a semiconductor junction temperature estimator transitions from an invalid status to a valid status to ensure proper convergence of semiconductor junction temperature estimation.

Another aspect of the disclosure may include a control system for a multi-phase electric machine (electric machine) that includes an inverter configured to transfer electric energy from a rechargeable energy storage device (RES S) to the electric machine, wherein the inverter is composed of a plurality of power switches; a plurality of first temperature sensors, wherein the plurality of first temperature sensors are arranged to monitor a plurality of semiconductor junction temperatures of the plurality of power switches; a heat exchanger, the heat exchanger thermally coupled to the inverter; a second temperature sensor, wherein the second temperature sensor is arranged to monitor a parameter of the heat exchanger; a position sensor arranged to monitor rotation of the electric machine; and a controller. The controller is operatively connected to the inverter and in communication with the plurality of first temperature sensors, the second temperature sensor, and the position sensor. The controller includes an instruction set that is executable to: determine, via the plurality of first temperature sensors, the plurality of semiconductor junction temperatures of the plurality of power switches; determine, via the second temperature sensor, the parameter of the heat exchanger; determine, via the position sensor, a rotational position of the electric machine; and control an electric power output from the inverter to the electric machine based upon the plurality of semiconductor junction temperatures of the plurality of power switches, the rotational position of the electric machine, and the parameter of the heat exchanger.

Another aspect of the disclosure may include the controller being operative to monitor operation of the heat exchanger; wherein the instruction set is executable to detect a fault in the heat exchanger; and derate the electric power output from the inverter to the electric machine in response to the fault in the heat exchanger.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
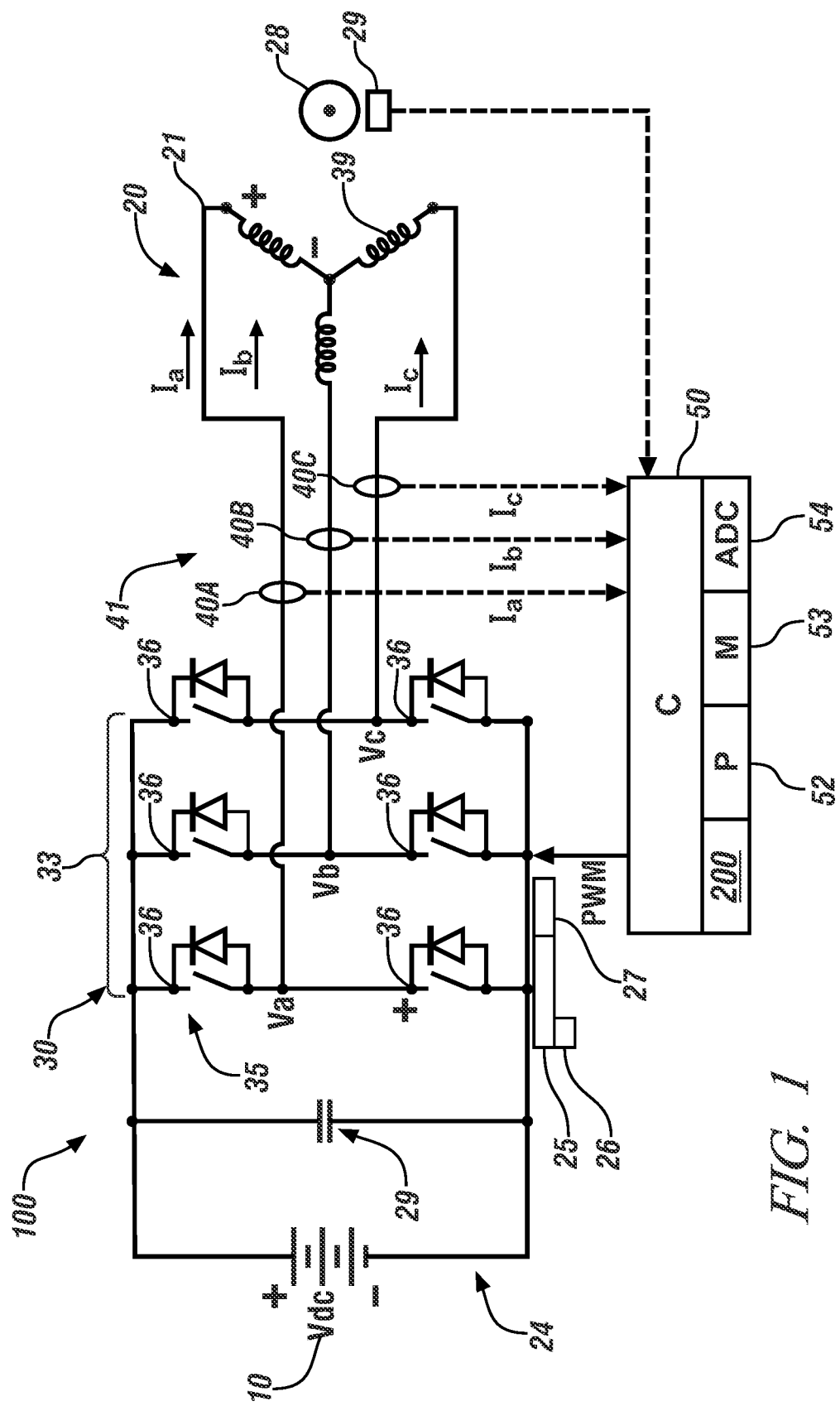
FIG. 1 schematically illustrates a multi-phase electric machine and control system, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail in order to avoid unnecessarily obscuring the disclosure. The disclosure, as illustrated and described herein, may be practiced in the absence of an element that is not specifically disclosed herein. Throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Embodiments may be described herein in terms of functional and/or logical block components and various processing steps. Such block components may be realized by a combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the embodiments may be practiced in conjunction with other mechanical and/or electronic systems, and that the vehicle systems described herein are merely embodiments of possible implementations.

The use of ordinals such as first, second and third does not necessarily imply a ranked sense of order, but rather may distinguish between multiple instances of an act or structure.

Referring to the drawings, wherein like reference numerals correspond to like or similar components throughout the several Figures, FIG. 1, consistent with embodiments disclosed herein, illustrates a non-limiting example of a multi-phase motor drive system 100. In one embodiment, the multi-phase motor drive system 100 may be disposed to provide propulsion torque in a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The multi-phase motor drive system 100 includes a rechargeable energy storage device (RESS) 10, a multi-phase rotary electric machine 20, an inverter 30, and a controller (C) 50. The inverter 30 transforms DC electric energy from the RESS 10 to AC electric energy that is supplied via bus 41 to phases of the multi-phase rotary electric machine 20 to generate torque in response to control commands from the controller 50. The controller 50 is programmed in software and equipped in hardware to execute recorded instructions embodying a temperature-based motor torque derating control routine 200. The temperature-based motor torque derating control routine 200 is described with reference to FIGS. 2 through 5.

The multi-phase rotary electric machine 20 may be a permanent magnet electric machine 20 including an annular-shaped stator 21 that forms a cylindrically-shaped void into which a coaxial rotor 28 is inserted, with an airgap formed between the stator 21 and the rotor 28. The rotor 28 is arranged on a rotatable shaft having ends that extend through apertures formed in endcaps of the stator, with mounting and bearings arranged therein. A rotational position/speed sensor 29 is arranged to monitor rotational speed and/or position of the rotor 28. In one embodiment, the rotational position/speed sensor 29 is a Hall-effect sensor, although the systems described herein may employ other position monitoring sensor technology, without limitation. The stator 21 houses a plurality of electrical windings 39 that are circumferentially arranged. The electrical windings 39 are electrically connected to the inverter 30, which is controlled by controller 50 to generate rotating electrical fields that induce magnetic fields adjacent to the rotor 28 and interact with the magnetic field of the permanent magnets to generate mechanical torque in the rotor 28. The electric machine 20 may be controlled to operate as a torque motor and/or an electric power generator. Details related to a physical configuration and operation of a permanent magnet electric machine 20 are understood by those skilled in the art, and thus not described in detail herein.

While it may be practical to implement the following approach digitally in a microcontroller, it may instead be implemented employing discrete components in one embodiment. For consistency, the controller 50 will be described hereinafter.

In one embodiment, the multi-phase motor drive system 100 may be employed in a vehicle, with the multi-phase electric machine 20 being a traction motor that provides propulsion torque.

The inverter 30 is configured as a plurality of power switches 35 (33) that are arranged as power switch pairs that electrically connect in series between the positive and negative conductors of a high-voltage DC bus 24, which is connected to the RESS 10. As shown, the electric machine 20 is configured as a three-phase device, and the inverter 30 includes three power switch pairs, each of which is connected to one of the phases of the electric machine 20. Each of the power switches 35 of the power switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. The controller 50 includes an inverter gate drive circuit having a plurality of gate drives and a controller, wherein the inverter gate drive circuit generates control signals to control activation and deactivation of individual ones of the power switches 35 in response to the control signals, e.g., pulsewidth-modulated (PWM) control signals, which originate from the motor control system 50. The inverter 30 includes other electrical components including capacitors, resistors and other electrical circuit components to accomplish functions related to electrical noise suppression, load balancing and the like.

The inverter 30 may employ pulsewidth-modulating (PWM) control of the IGBTs to convert stored DC electric power originating in the RESS 10 to AC electric power to drive the rotary electric machine 20 to generate torque. Similarly, the power inverter 30 converts mechanical power transferred to the rotary electric machine 20 to DC electric power to generate electric energy that is storable in the RESS 10, including as part of a regenerative braking control strategy when employed on-vehicle. The power inverter 30 receives motor control commands from the controller 50 and controls inverter states to provide the motor drive and regenerative braking functionality.

Each of the power switches 35 has a first temperature sensor 36 that is arranged to monitor temperature at or near a semiconductor junction thereof, and is in communication with the controller 50. Each of the first temperature sensors 36 may be a thermistor in one embodiment. Alternatively, the first temperature sensors 36 may be thermocouple junctions or other temperature monitoring devices, without limitation.

One temperature of interest is a semiconductor junction temperature on each of the power switches 35, e.g., a PN semiconductor junction on an IGBT transistor. The first temperature sensors 36 may be placed in close proximity to the semiconductor junctions, but may not accurately reflect the actual temperature at the semiconductor junction, or may lag the temperature at the semiconductor junction. When the temperature as measured by one of the first temperature sensors 36 does not accurately reflect the actual temperature at the semiconductor junction, it may affect the ability of the controller 50 to respond in a timely manner, which may lead to occurrence of an excess temperature condition.

One or multiple heat exchanger(s) 25 are in thermal contact with the RESS 10 and the power inverter 30 to effect heat transfer. One or multiple second temperature sensor(s) 26 is arranged to monitor temperature(s) of the heat exchanger(s) 25, and/or a temperature of coolant that may be circulated to the heat exchanger(s) 25. The heat exchangers 25 may be fluidic devices through which fluidic coolant is circulated via a fluidic pump 27 in one embodiment. Alternatively, the heat exchangers 25 may be heat pump devices in one embodiment, such as a thermoelectric device that operates in accordance with the Peltier effect. Alternatively, the heat exchangers 25 may be air-to-air heat exchangers employing a controllable fan, or another configuration without limitation. The second temperature sensor(s) 26 may be a thermistor in one embodiment. Alternatively, the second temperature sensor(s) 26 may be a thermocouple junction or another temperature monitoring device, without limitation.

The RESS 10 is a rechargeable device, e.g., a multi-cell lithium ion battery or nickel metal hydride battery.

The phase currents delivered to the electric machine 20 are individually and separately measured via phase current sensors 40A, 40B, 40C using a measurement process. The phase current sensors 40A, 40B, 40C may be Hall effect sensors in one embodiment.

The controller 50 includes a processor (P) 52 and tangible, non-transitory memory (M) 53 on which is recorded instructions embodying the temperature-based motor torque derating control routine 200. The controller 50 may also include an analog-to-digital converter (ADC) 54. The ADC 54 may be embodied as an electrical circuit providing a specific sampling rate which provides quantization of the continuous/analog voltage input and outputs a representative digital signal. The memory 53 may include read-only memory (ROM), flash memory, optical memory, additional magnetic memory, etc., as well as random access memory (RAM), electrically-programmable read only memory (EPROM), a high-speed clock, analog-to-digital (A/D) and/or digital-to-analog (D/A) circuitry, input/output circuitry or devices, and signal conditioning and buffer circuitry.

The controller 50 commands, or causes the inverter 30 to generate a set of pulsewidth modulation signals (arrow PWM). These PWM signals provide switching control of the input voltage used to power the multi-phase electric machine 20. The controller 50 receives the three measured phase current signals from the phase current sensors 40A, 40B, 40C.

Multi-phase motor systems may require accurate sensing of each of the applied phase currents, e.g., currents $I_a$, $I_b$, and $I_c$. Measured phase currents may be used for various motor control, feedback, diagnostic, and monitoring purposes. In the example system of FIG. 1, the phase current sensors 40A, 40B, 40C are used to individually measure the phase currents flowing from the inverter 30 to the multi-phase electric machine 20. In one embodiment, the phase current sensors 40A, 40B, 40C are positioned in the inverter 30 as shown, although the phase current sensors 40A, 40B, 40C may be positioned between the inverter 30 and the electric machine 20 whose phase currents are being measured.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and similar signals that are capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter may have a discrete value, e.g., either "1" or "0", or may be infinitely variable in value.

Figure 2:
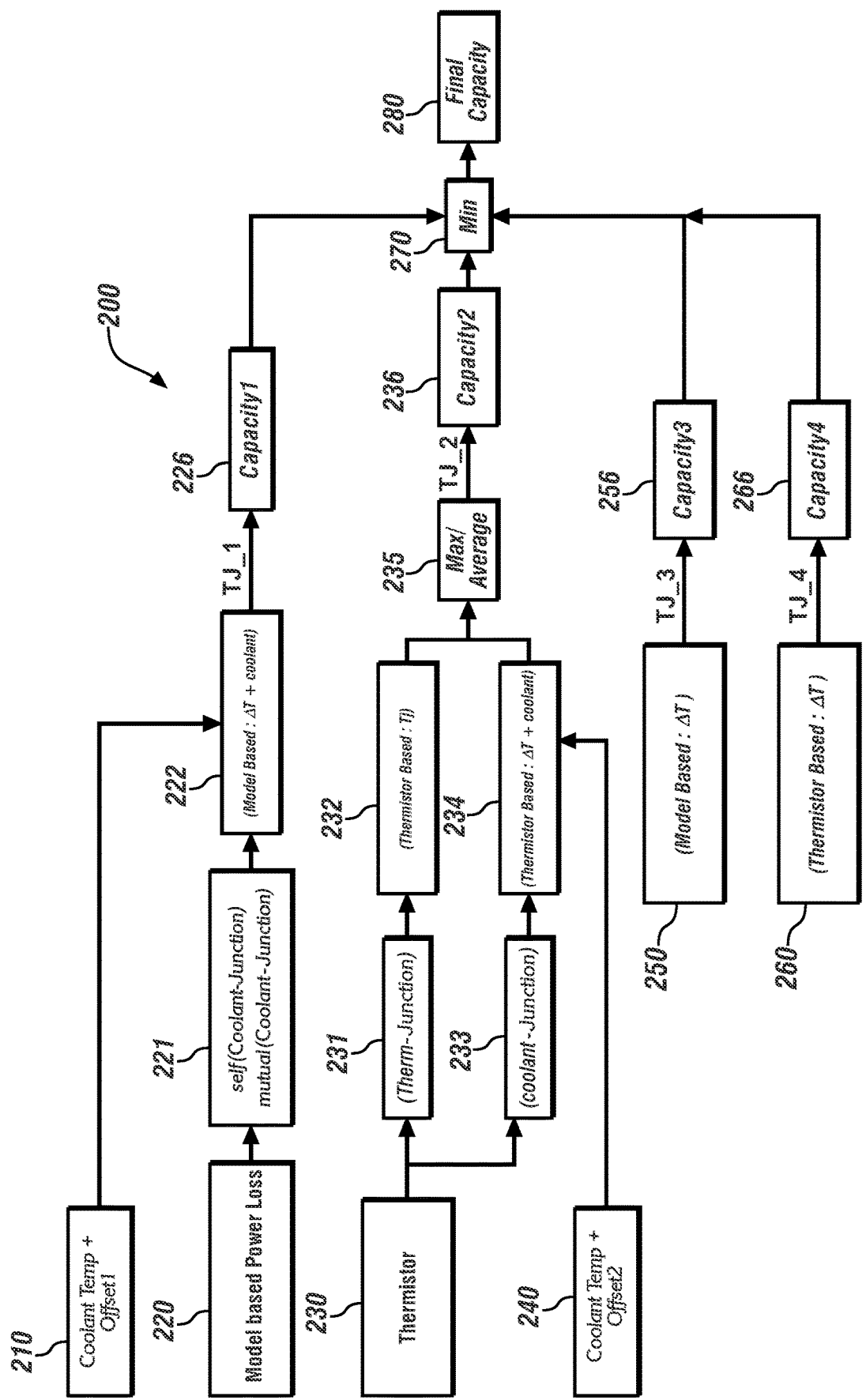
FIG. 2 schematically illustrates a temperature-based motor torque derating control routine for controlling operation of an embodiment of the multi-phase electric machine and inverter that are described with reference to FIG. 1, in accordance with the disclosure.

FIG. 2 schematically illustrates an embodiment of a temperature-based motor torque derating control routine 200 for controlling operation of an embodiment of the multi-phase motor drive system 100 including the multi-phase electric machine 20 and inverter 30 that are described with reference to FIG. 1.

The temperature-based motor torque derating control routine 200 is executed to control operation of an embodiment of the multi-phase electric machine and inverter.

One parameter of interest is a junction temperature, which is a temperature of a semiconductor junction (e.g., PN junction) in each of the power switches 35 of the inverter 30. Prolonged operation of one of the power switches 35 at elevated temperatures may lead to semiconductor material deterioration and degradation at the semiconductor junction, and thus may lead to a fault in the power switch 35, thus affecting the service life of the inverter 30.

Overall, the temperature-based motor torque derating control routine 200 employs multiple evaluations, preferably executed in parallel, to estimate or otherwise determine semiconductor junction temperatures in the power switches 35 and control operation of the inverter 30 (and thus the electric machine 20) based thereon. This includes derating the motor torque output from the electric machine 20 when one or more of the estimates or other determinations of the semiconductor junction temperatures in the power switches 35 indicates actual or likely temperatures that exceed an allowable or permissible temperature. This includes integrating measured junction temperature in conjunction with a model-based junction temperature estimator to achieve a robust device thermal protection, protection against an invalid junction temperature estimation from the thermal model, and a faster stall torque recovery.

The derating of the motor torque output from the electric machine 20 includes reducing motor torque capacity, i.e., reducing a maximum electric power flow through the power switches 35 of the inverter 30 to limit the maximum junction semiconductor junction temperatures to be within an allowable temperature range.

The semiconductor junction temperatures in the power switches 35 are determined as follows.

A first temperature parameter in the form of a first semiconductor junction temperature is determined based upon a modeled or otherwise expected junction temperature that is determined based upon the coolant temperature (Coolant Temp+Offset1) (Block 210). A first temperature parameter in the form of a first junction temperature (TJ_1) is determined by estimating an expected power loss in the inverter, wherein the magnitude of the power loss is determined based upon electric current, switching functions, electrical characteristics of the plurality of power switches, the inverter operating conditions (V, I) and the coolant temperature (Blocks 220, 221, 222). A first power capacity (Capacity1) is determined based upon the expected power loss in the inverter and the first junction temperature (TJ_1) (Block 226).

A second temperature parameter in the form of an average measured junction temperature is determined based upon the measured temperatures from the plurality of first temperature sensors 36 associated with the plurality of power switches 35 (Thermistor) and the coolant temperature from the second temperature sensor 26 (Block 220).

A plurality of first preliminary junction temperatures is determined for each of the plurality of power switches 35 based upon the measured temperatures from the plurality of first temperature sensors 36 from the plurality of power switches 35 (Blocks 230, 231, 232). A plurality of second preliminary junction temperatures is determined for each of the plurality of power switches 35 based upon the measured temperatures from the plurality of first temperature sensors 36 from the plurality of power switches 35 and the coolant temperature from the second temperature sensor 26 (Blocks 233, 234). This operation includes offsetting thermistor mapped junction temperature measurements to consider coolant temperature variations in relation to the respective thermistor's physical location (Coolant Temp+Offset2) (Block 240).

A maximum value and/or a mean value (Max/Average) are determined based upon the plurality of first preliminary junction temperatures and the plurality of second preliminary junction temperatures to determine a second temperature parameter (TJ_2) (Block 235). This includes calculating the second derating capacity (Capacity2) based upon one of an average or maximum of the two thermistor mapped junction temperatures and pre-determined thresholds using linear interpolation (Block 236). This includes estimating a junction temperature from directly mapping thermistors, and using thermistor measurements and the coolant temperature. The final temperature is either an average or a maximum of two temperatures and the second derating capacity (Capacity2) is based upon the final thermistor-based semiconductor junction temperature.

A third temperature parameter in the form of an expected or modelled semiconductor junction temperature increase is determined (Block 250). The third temperature parameter is determined based upon the first temperature parameter in the form of temperature change or difference (increase or decrease) between a modelled semiconductor junction temperature and the coolant temperature, and is determined based upon coolant temperature variations and physical locations of the plurality of first temperature sensors 36 relative to a respective semiconductor junction of the respective one of the power switches 35. A third power capacity (Capacity3) is determined based upon the expected or modelled semiconductor junction temperature increase (Block 256).

A fourth temperature parameter is determined, and is based upon the second temperature parameter in the form of temperature change or difference (increase or decrease) between a modelled semiconductor junction temperature and the coolant temperature (Block 260). A fourth power capacity (Capacity4) is determined based upon the fourth temperature parameter (Block 266).

The estimated semiconductor junction temperatures and the modelled semiconductor junction temperatures may incorporate and/or account for thermal inertias, heat capacities of various components, signal latencies and other factors that may cause a difference between an actual semiconductor junction temperature and a semiconductor junction temperature that is measured, estimated, modelled, or otherwise determined.

The estimated semiconductor junction temperatures and the modelled semiconductor junction temperatures may be determined based upon inverter operating parameters (V, I, torque output, speed, etc.), coolant temperatures, ambient temperatures, and other parameters. The estimated semiconductor junction temperatures and the modelled semiconductor junction temperatures may be predetermined and reduced to practice as lookup tables (LUTs), equations, or other calibrations that may be implemented in a memory device.

The inverter 30 is controlled based upon the first power capacity, the second power capacity, the third power capacity, and the fourth power capacity.

This includes evaluating each of the modelled or estimated temperatures or temperature parameters to determine if they are valid, i.e., to determine whether the underlying measurements and estimates employed in determining the modelled or estimated temperatures or temperature parameters are valid.

When there is a fault in the system, or an indication that signal integrity has been corrupted or otherwise interfered with, the power capacity associated with the corrupted or otherwise invalid measurement is eliminated from further evaluation.

The temperature-based motor torque derating control routine 200 selects the minimum (Min) of the valid ones of the first power capacity (Capacity1), the second power capacity (Capacity2), the third power capacity (Capacity3), and the fourth power capacity (Capacity4) (Block 270).

The temperature-based motor torque derating control routine 200 employs the minimum torque capacity (Final Torque Capacity) to control the power inverter 30 to operate the electric machine 20 to generate torque (Block 280). This includes derating of the motor torque output from the electric machine 20 by reducing a maximum electric power flow through the power switches 35 of the inverter 30 to reduce or limit the maximum semiconductor junction temperatures to be within an allowable temperature range.

Figure 3:
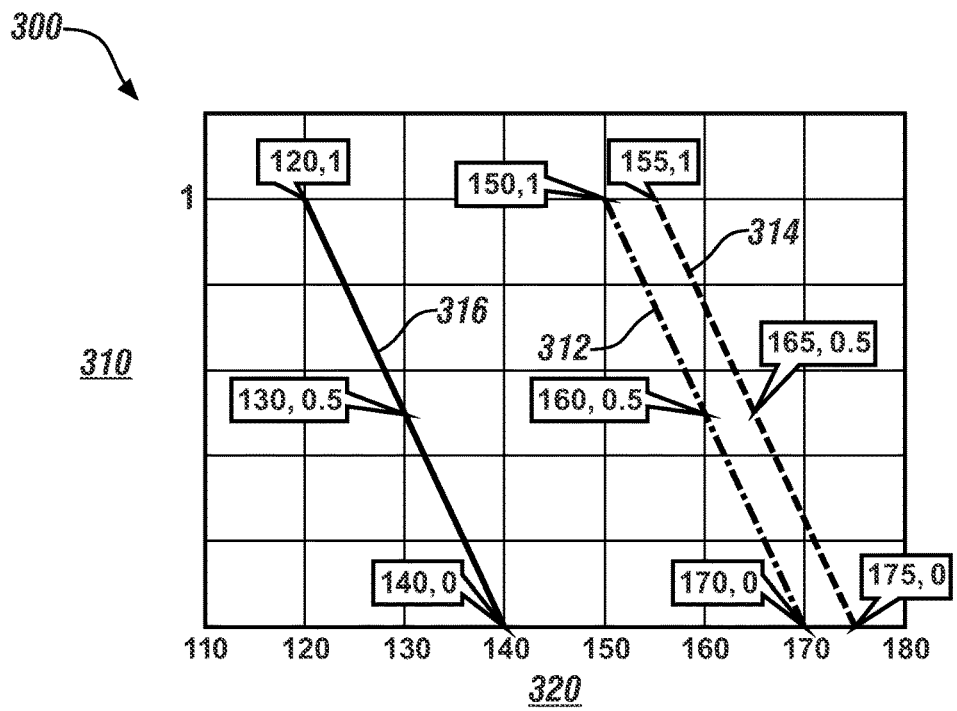
FIG. 3 graphically illustrates temperature-based motor torque derating in relation to temperature that is associated with operation of an embodiment of the multi-phase electric machine and inverter that are described with reference to FIG. 1, in accordance with the disclosure.

FIG. 3 graphically illustrates examples of torque capacity reductions (300) in response to a torque derating due to semiconductor junction temperatures, with torque capacity 310 illustrated on the vertical axis and temperature 320 illustrated on the horizontal axis. When the indicated torque capacity is 1.0, it indicates unrestricted torque output from the electric machine. When the indicated torque capacity is less than 1.0, it indicates a derated torque output from the electric machine, wherein the derated torque output from the electric machine is selected to avoid or minimize the likelihood of occurrence of an overtemperature state at the semiconductor junctions of the power switches 35.

Line 314 indicates the second power capacity (Capacity2), with the temperature being the second semiconductor junction temperature (TJ_2) that is associated with the second power capacity (Capacity2).

Line 312 indicates first power capacity (Capacity1) in relation to temperature, with the temperature being the first semiconductor junction temperature (TJ_1) that is associated with the first power capacity (Capacity1).

Line 316 indicates the third and the fourth power capacities (Capacity3/Capacity4), with the temperature being the third semiconductor junction temperature (TJ_3) that is associated with the third power capacity (Capacity3) or the fourth semiconductor junction temperature (TJ_4) that is associated with the fourth power capacity (Capacity4).

This torque capacity reduction graph indicates a more restrictive reduction in torque capacity based upon the third and fourth semiconductor junction temperatures (TJ_3, TJ_4), i.e., a more restrictive reduction in torque capacity in response to temperature differentials between the coolant temperature and the semiconductor junction temperature as compared to either the measured or modeled temperatures (TJ_1, TJ_2).

This torque capacity reduction graph indicates a least restrictive reduction in torque capacity based upon the second semiconductor junction temperature (TJ_2), i.e., a least restrictive reduction in torque capacity in response to raw measurement of the temperature via the first temperature sensors 36 compared to the other temperatures (TJ_1, TJ_3, TJ_4).

Figure 4:
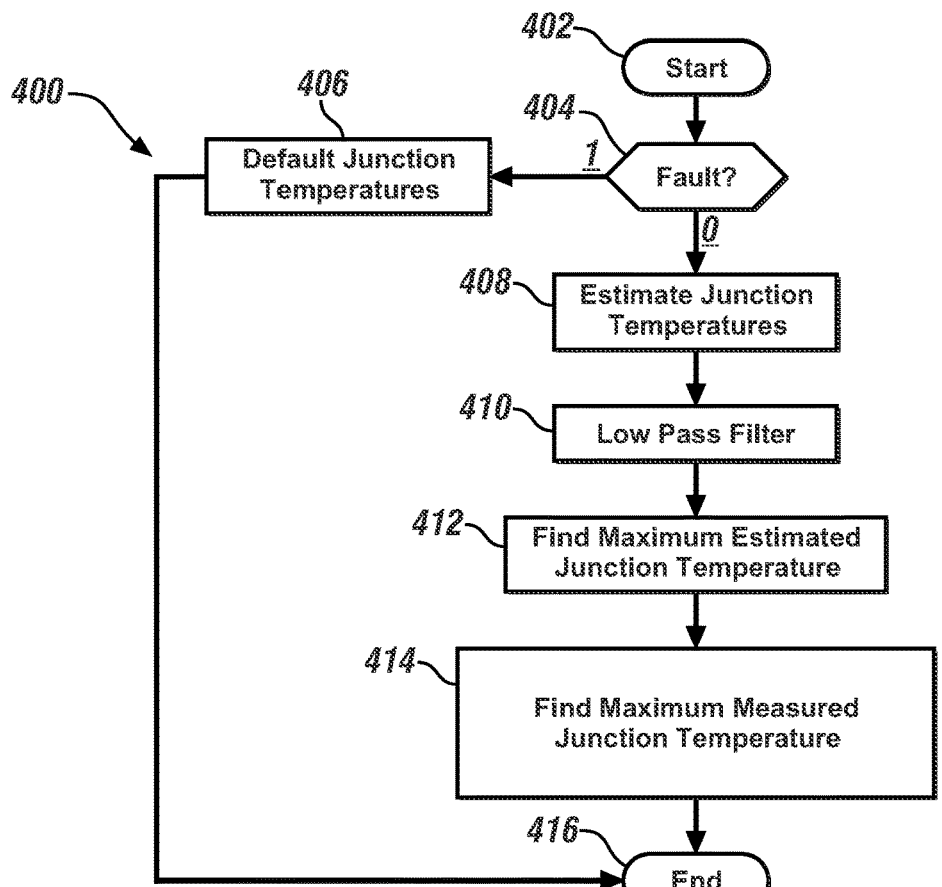
FIG. 4 schematically illustrates certain details related to a temperature-based motor torque derating control routine for controlling operation of an embodiment of the inverter that is described with reference to FIG. 1, in accordance with the disclosure.
Figure 5:
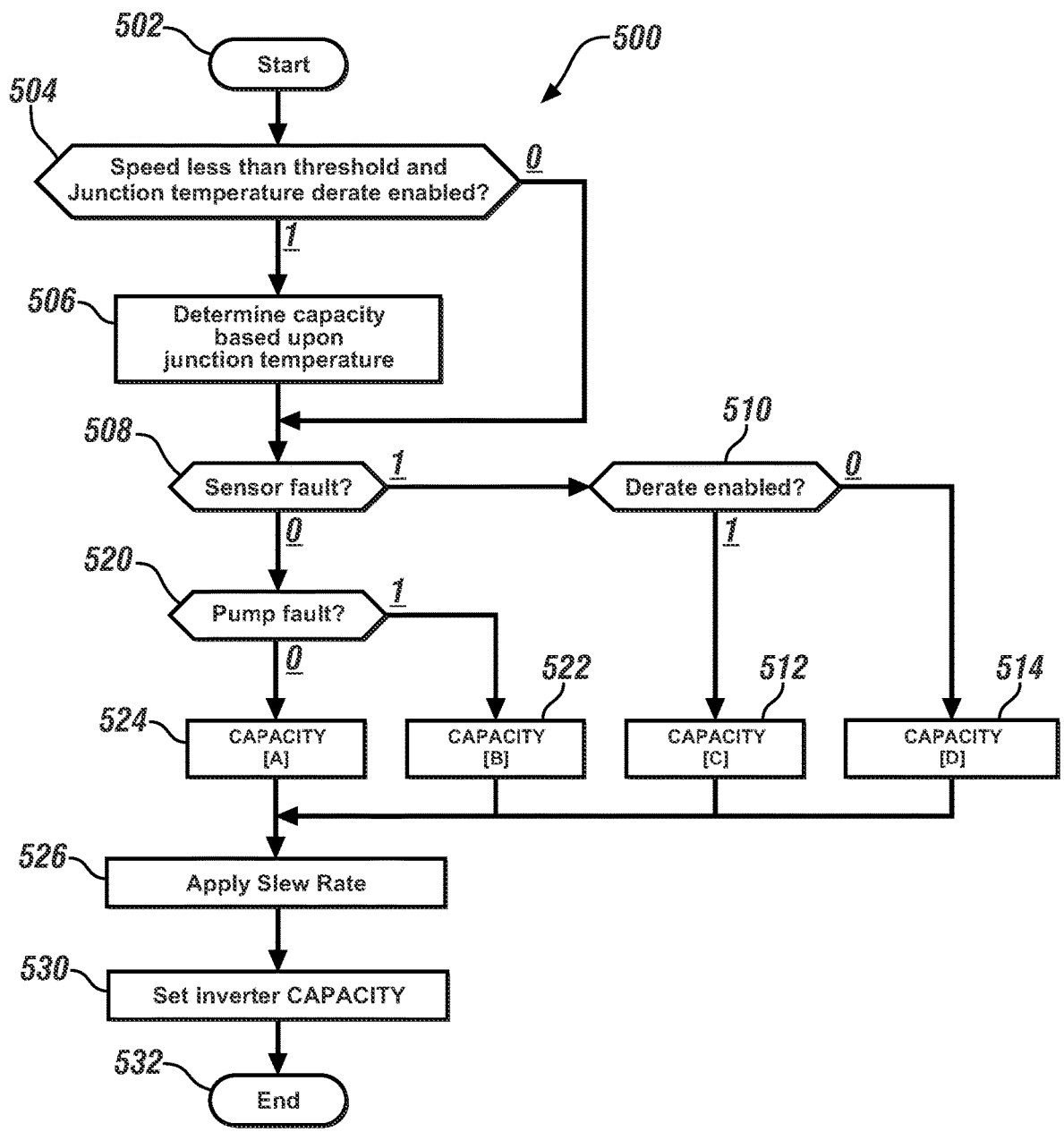
FIG. 5 schematically illustrates certain details related to a temperature-based motor torque derating control routine for controlling operation of an embodiment of the inverter that is described with reference to FIG. 1, in accordance with the disclosure.

FIGS. 4 and 5 schematically illustrate certain details related to a temperature-based motor torque derating control routine for controlling operation of an embodiment of the inverter that is described with reference to FIG. 1, employing the temperature-based motor torque derating control routine 200 that is described with reference to FIG. 2.

FIG. 4 schematically illustrates a first routine 400 related to a temperature-based motor torque derating control routine for controlling operation of an embodiment of the inverter that is described with reference to FIG. 1, employing the temperature-based motor torque derating control routine 200 that is described with reference to FIG. 2. Initially, semiconductor junction temperatures are determined, by measurement via first temperature sensors 36 and/or model-based estimates (Step 402). The semiconductor junction temperatures are evaluated to determine occurrence of a fault that renders the semiconductor junction temperatures inaccurate or unreliable (Step 404). When occurrence of a fault renders the semiconductor junction temperatures inaccurate or unreliable (Step 404)(1), the semiconductor junction temperature is set to a default value based upon a differential inverter temperature (Step 406), and this iteration ends (Step 416).

When there is no fault associated with the semiconductor junction temperatures (Step 404)(0), the semiconductor junction temperatures for the plurality of power switches 35 are estimated based upon inverter power loss data (Step 408), and subjected to low pass filtering (Step 410). A maximum value of the filtered semiconductor junction temperatures for the plurality of power switches 35 is identified (Step 412) and subjected to scaling to determine the maximum semiconductor junction temperature (Step 414), which is employed for controlling the torque capacity of the electric machine, including derating the inverter based upon the torque capacity reductions described with reference to FIG. 3, and this iteration ends (Step 416).

FIG. 5 schematically illustrates a second routine 500 related to a temperature-based motor torque derating control routine for controlling operation of an embodiment of the inverter that is described with reference to FIG. 1, employing the temperature-based motor torque derating control routine 200 that is described with reference to FIG. 2, and accounting for occurrence of a fault at low rotational speeds.

Initially, determining inverter capacity (Step 502) includes determining if the rotor speed is less than a threshold speed, wherein the threshold speed is at or near a stall speed, and also determining if a routine is enabled to determine torque derate based upon the semiconductor junction temperature (Step 504).

When both conditions are true (Step 504)(1), the second routine 500 executes the temperature-based motor torque derating control routine 200 described with reference to FIG. 2 to determine the minimum (Min) of the valid ones of the first power capacity (Capacity1), the second power capacity (Capacity2), the third power capacity (Capacity3), and the fourth power capacity (Capacity4), which provides a minimum torque capacity based upon the semiconductor junction temperature during operation at or near a stall speed (Step 506).

When either or both conditions are false (Step 504)(0), the second routine 500 skips the temperature-based motor torque derating control routine 200.

Following on, the second routine 500 evaluates signal outputs from the first temperature sensors 36 to detect occurrence of a fault (Step 508), and also evaluates operation of the heat exchanger 25, including evaluating operation of the fluidic pump 27 that circulates coolant fluid to the heat exchanger 25 (Step 520).

When no fault related to the first temperature sensors 36 is detected (Step 508)(0), and no fault related to the operation of the heat exchanger 25 is detected (Step 520)(0), the inverter torque capacity is set based upon a fully functional cooling system that includes the heat exchanger 25 (Step 524), i.e., the inverter torque capacity is set based upon the temperature output from the first temperature sensors 36 being valid and the heat exchanger 25 and the fluidic pump 27 are operating at their maximum heat rejection capacity to remove heat from inverter 30.

When no fault related to the first temperature sensors 36 is detected (Step 508)(0), but a fault related to the operation of the heat exchanger 25 is detected (Step 520)(1), the inverter torque capacity is set based upon a cooling system having decreased functionality (Step 522), i.e., the inverter torque capacity is derated based upon the temperature output from the first temperature sensors 36 being valid but the heat exchanger 25 and the fluidic pump 27 not being fully capable of removing heat from the inverter 30. One potential fault related to the operation of the heat exchanger 25 may be a fault related to operation of the fluidic pump 27, such as a decreased flowrate. Systems and methods for fault detection related to operation of the heat exchanger 25 and the fluidic pump 27 are understood by skilled practitioners.

When a fault related to one of the first temperature sensors 36 is detected (Step 508)(1), it is determined if one of the estimated, modeled or measured semiconductor junction temperatures may be employed to determine a valid semiconductor junction temperature with power derating being enabled (Step 510).

If so (Step 510)(1), the torque capacity of the inverter 30 is set based upon the temperature output from the first temperature sensors 36 being valid, with the inverter torque capacity being derated based upon the temperature output from the first temperature sensors 36 (Step 512).

If not (Step 510)(0), the inverter torque capacity is set utilizing default torque calibrations and reduced torque output to minimize likelihood of overheating of the semiconductor junctions (Step 514).

A slew rate is applied to the inverter torque capacity that is output from one of Steps 512, 514, 522 and 524 avoid rapid changes in the inverter torque capacity and minimize the effect of signal noise (Step 526). The inverter torque capacity for operating the inverter is selected as a minimum value based upon the inverter torque capacities previously determined (Step 530), and this iteration ends (Step 532).

Temperature-based motor torque derating in a stall torque region may employ stall-worry zone times under certain operating conditions, such as low speed, high torque operation.

This includes extending a stall-worry zone timer when the model-based semiconductor junction temperature estimator is valid and the semiconductor junction temperature-based derating is enabled. This includes utilizing a restricted stall-worry zone timer when the model-based semiconductor junction temperature estimator is invalid or when the semiconductor junction temperature-based derating is disabled. During a transition of temperature estimator from an invalid state to a valid state, a calibratable delay is used before extending stall-worry zone timers. This delay ensures proper convergence of semiconductor junction temperature estimation before using it. This enables an extension and faster recovery of the stall torque capability which results into improved off road vehicle performance, and provides robust thermal protection by utilizing thermistor measurements.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that may direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A control system for a multi-phase electric machine, comprising:
   an inverter configured to transfer electric energy from a rechargeable energy storage device (RESS) to the multi-phase electric machine, wherein the inverter is composed of a plurality of power switches;
   a heat exchanger, the heat exchanger thermally coupled to the inverter;

a plurality of first temperature sensors, wherein the plurality of first temperature sensors are arranged to monitor temperatures of the plurality of power switches;
a second temperature sensor, wherein the second temperature sensor is arranged to monitor a parameter of the heat exchanger; and
a controller, the controller being operatively connected to the inverter and in communication with the plurality of first temperature sensors and the second temperature sensor, the controller including an instruction set, the instruction set being executable to:
  determine an expected power loss in the inverter based upon the temperatures of the plurality of power switches;
  determine a first temperature parameter based upon the expected power loss in the inverter and the parameter of the heat exchanger;
  determine a first power capacity based upon the expected power loss in the inverter and the first temperature parameter;
  determine a second temperature parameter based upon the temperatures of the plurality of power switches, and determine a second power capacity based upon the second temperature parameter;
  determine a third temperature parameter based upon the first temperature parameter and a difference between the temperatures of the plurality of power switches and the parameter of the heat exchanger, and determine a third power capacity based upon the third temperature parameter;
  determine a fourth temperature parameter based upon a difference between the temperatures of the plurality of power switches and the parameter of the heat exchanger, and determine a fourth power capacity based upon the fourth temperature parameter; and
  control the inverter based upon the first power capacity, the second power capacity, the third power capacity, and the fourth power capacity.

2. The control system of claim 1, wherein the plurality of first temperature sensors comprises one of a plurality of thermistors or a plurality of thermocouples.

3. The control system of claim 1, wherein the heat exchanger comprises a fluidic heat exchanger thermally coupled to the plurality of power switches, and wherein the second temperature sensor is arranged to monitor temperature of a fluid that is circulated through the fluidic heat exchanger.

4. The control system of claim 1, wherein the instruction set being executable to control the inverter based upon the first power capacity, the second power capacity, the third power capacity, and the fourth power capacity comprises the instruction set being executable to control the inverter based upon a minimum of the first power capacity, the second power capacity, the third power capacity, and the fourth power capacity.

5. The control system of claim 4, wherein the instruction set being executable to control the inverter based upon a minimum of the first power capacity, the second power capacity, the third power capacity, and the fourth power capacity comprises the instruction set being executable to derate a maximum power output of the inverter based upon the minimum of the first power capacity, the second power capacity, the third power capacity, and the fourth power capacity.

6. The control system of claim 4, further comprising the instruction set being executable to:
  determine valid ones of the first temperature parameter, the second temperature parameter, the third temperature parameter, and the fourth temperature parameter;
  determine valid ones of the first power capacity, the second power capacity, the third power capacity, and the fourth power capacity based upon the valid ones of the first temperature parameter, the second temperature parameter, the third temperature parameter, and the fourth temperature parameter; and
  control the inverter based upon a minimum of the valid ones of the first power capacity, the second power capacity, the third power capacity, and the fourth power capacity.

* * * * *